(12) United States Patent
Liu et al.

(10) Patent No.: US 9,215,498 B2
(45) Date of Patent: Dec. 15, 2015

(54) VIDEO DATA TRANSMISSION PROCESSING METHOD, VIDEO DATA SENDING PROCESSING METHOD, APPARATUS, NETWORK SYSTEM

(75) Inventors: Meng Liu, Shenzhen (CN); Yi Guoi, Shenzhen (CN); Houqiang Li, Shenzhen (CN); Mingyuan Yang, Beijing (CN); Changqi Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 911 days.

(21) Appl. No.: 13/434,400

(22) Filed: Mar. 29, 2012

(65) Prior Publication Data
US 2012/0192031 A1  Jul. 26, 2012

Related U.S. Application Data

(63) Continuation of application No. PCT/CN2010/077526, filed on Sep. 30, 2010.

(30) Foreign Application Priority Data

Sep. 30, 2009  (CN) .......................... 2009 1 0179726

(51) Int. Cl.
*H03M 13/00*  (2006.01)
*H04N 21/438*  (2011.01)
(Continued)

(52) U.S. Cl.
CPC ............ *H04N 21/4382* (2013.01); *H04L 1/007* (2013.01); *H04N 19/147* (2014.11); *H04N 19/166* (2014.11); *H04N 19/40* (2014.11); *H04N 19/46* (2014.11); *H04N 21/2383* (2013.01)

(58) Field of Classification Search
CPC ..... H04L 1/007; H04L 1/0057; H04L 1/0041; H03M 13/11; H03M 13/27; G11B 20/1833
USPC .................................. 714/752, 776, 786, 758
See application file for complete search history.

(56) References Cited

U.S. PATENT DOCUMENTS 6,233,283 B1 * 5/2001 Chiu et al. ............... 375/240.27
6,339,450 B1 * 1/2002 Chang et al. .................. 348/470
(Continued)

FOREIGN PATENT DOCUMENTS

CN        1679330 A    10/2005
CN        1988664 A    6/2007
(Continued)

OTHER PUBLICATIONS

Chinese Patent No. 102036061, issued on Nov. 21, 2012, granted in corresponding Chinese Patent Application No. 200910179726.5.
(Continued)

*Primary Examiner* — Albert Decady
*Assistant Examiner* — Osman Alshack
(74) *Attorney, Agent, or Firm* — Brinks Gilson & Lione

(57) ABSTRACT

Embodiments of the present invention provide a video data transmission processing method, a video data sending processing method, an apparatus, and a network system. The data transmission processing method includes: receiving a source stream sent from a source transmission network to a target transmission network; performing, according to respective packet loss rates of the source transmission network and the target transmission network as well as error tolerance aid information corresponding to the source stream, error tolerance coding processing on the source stream to obtain an error tolerance stream; and sending the obtained error tolerance stream to the target transmission network.

21 Claims, 7 Drawing Sheets

(51) Int. Cl.

| | | |
|---|---|---|
| H04L 1/00 | (2006.01) | |
| H04N 21/2383 | (2011.01) | |
| H04N 19/147 | (2014.01) | |
| H04N 19/46 | (2014.01) | |
| H04N 19/166 | (2014.01) | |
| H04N 19/40 | (2014.01) | |

(56) References Cited

U.S. PATENT DOCUMENTS

| | | | |
|---|---|---|---|
| 8,964,830 B2* | 2/2015 | Perlman et al. | 375/240.01 |
| 2002/0136162 A1* | 9/2002 | Yoshimura et al. | 370/229 |
| 2007/0223583 A1* | 9/2007 | Nagai et al. | 375/240.12 |
| 2008/0148327 A1* | 6/2008 | Xu | 725/105 |
| 2009/0016228 A1* | 1/2009 | Ichiki | 370/241 |
| 2009/0034633 A1* | 2/2009 | Rodirguez et al. | 375/240.28 |
| 2009/0138784 A1* | 5/2009 | Tamura et al. | 714/776 |
| 2010/0166066 A1* | 7/2010 | Perlman et al. | 375/240.07 |
| 2011/0007790 A1* | 1/2011 | Xu et al. | 375/225 |

FOREIGN PATENT DOCUMENTS

| | | |
|---|---|---|
| CN | 101030832 A | 9/2007 |
| CN | 101072083 A | 11/2007 |
| CN | 101155311 A | 4/2008 |
| CN | 101252425 A | 8/2008 |
| EP | 1028593 A2 | 8/2000 |
| EP | 1028593 A3 | 1/2005 |
| JP | 2005151600 A | 6/2005 |
| WO | WO 2011038694 A1 | 4/2011 |

OTHER PUBLICATIONS

Extended European Search Report issued in corresponding European Patent Application No. 10819923.3, mailed Oct. 12, 2012.

Cavusoglu et al., "Real-Time Low-Complexity Adaptive Approach for Enhanced QoS and Error Resilience in MPEG-2 Video Transport Over RTP Networks" IEEE Transactions on Circuits and Systems for Video Technology, vol. 15, No. 11, Nov. 2005. XP 001512932.

Shan et al., "Scalable Video Streaming with Fine-Grain Adaptive Forward Error Correction" IEEE Transactions on Circuits and Systems for Video Technology, vol. 19, No. 9, Sep. 2009.

International Search Report and Written Opinion of the International Searching Authority issued in corresponding PCT Patent Application No. PCT/CN2010/077526, mailed Jan. 6, 2011.

Guo et al., "SVC/AVC Loss Simulator Donation" Joint Video Team (JVT) of ISO/IEC MPEG & ITU-T VCEG, 17$^{th}$ Meeting: Nice, France, Oct. 14-21, 2005.

Wang et al, Error Resilient Video Coding Using Flexible Reference Frames Visual Communications and Image Processing, 2005.

Yang et al., "Unequal Loss Protection for Robust Transmission of Motion Compensated Video Over the Internet" Signal Processing: Image Communication, vol. 18. 2003.

Horn et al., "Robust Internet Transmission Based on Scalable Coding and Unequal Error Protection" Signal Processing: Image Communication, vol. 15, 1999.

Yang et al., "Advances in Recursive Per-Pixel End-to-End Distortion Estimation for Robust Video Coding in H.264/AVC" IEEE Transactions on Circuits and Systems for Video Technology, vol. 17, No. 7, Jul. 2007.

Zhang et al., "Video Coding with Optimal Inter/Intra-Mode Switching for Packet Loss Resilience" IEEE Journal on Selecting Areas in Communications, vol. 18, No. 6, Jun. 2000.

Zhang et al, "Joint Source-Channel Rate-Distortion Optimization for H.264 Video Coding Over Error-Prone Networks" IEEE Transactions on Multimedia, vol. 9, No. 3, Apr. 2007.

He et al., "Joint Source Channel Rate-Distortion Analysis for Adaptive Mode Selection and Rate Control in Wireless Video Coding" IEEE Transactions on Circuits and Systems for Video Technology, vol. 12, No. 6, Jun. 2002.

Wang et al., "Error Resilient Video Coding Techniques: Real-Time Video Communications Over Unreliable Networks" IEEE Signal Processing Magazine, Jul. 2000.

Wiegand et al., "Overview of the H.264/AVC Video Coding Standard" IEEE Transactions on Circuits and Systems for Video Technology, vol. 13, No. 7, Jul. 2003.

Lie et al., "Error Resilient Motion Estimation and Mode Decision for Robust H.264/AVC Video Transmission" Ninth IEEE International Symposium on Multimedia, Workshops 2007.

Tillo et al., "Redundant Slice Optimal Allocation for H.264 Multiple Description Coding" IEEE Transactions on Circuits and Systems for Video Technology, vol. 18, No. 1, Jan. 2008.

Wang et al., "Unequal Error Protected Transmission with Dynamic Classification in H.264/AVC" IEEE 2007.

Dogan et al., "Error-Resilient Video Transcoding for Robust Internetwork Communications Using GPRS" IEEE Transactions on Circuits and Systems for Video Technology, vol. 12, No. 6, Jun. 2002.

Chou et al. "Rate-Distortion Optimized Streaming of Packetized Media" IEEE Transactions on Multimedia, vol. 8, No. 2, Apr. 2006.

de los Reyes et al., "Error-Resilient Transcoding for Video over Wireless Channels" IEEE Journal on Selected Areas in Communications, vol. 18, No. 6, Jun. 2000.

Pateux et al., "An Excel Add-In for Computing Bjontegaard Metric and Its Evolution" ITU—Telecommunications Standardization Sector, Study Group 16, Question 6. Video Coding Experts Group (VCEG). 31$^{st}$ Meeting: Marrakech, MA. Jan. 15-16, 2007.

Zhu et al., "Adaptive Redundant Picture Coding" Joint Video Team (JVT) of ISO/IEC MPEG & ITU-T VCEG, 21$^{st}$ Meeting: Hangzhou, China. Oct. 20-27, 2006.

Chiou et al., "Error-Resilient Transcoding Using Adaptive Intra Refresh for Video Streaming" IEEE 2004.

Zhu et al., "Coding of Redundant Pictures for Improved Error Resilience" Joint Video Team (JVT) of ISO/IEC MPEG & ITU-T VCEG, 18$^{th}$ Meeting: Bankok, Thailand. Jan. 14-20, 2006.

Guo et al, "SVC/AVC Loss Simulator Donation" Joint Video Team (JVT) of ISO/IEC MPEG & ITU-T VCEG, 17$^{th}$ Meeting: Nice, France. Oct. 14-21, 2005.

* cited by examiner

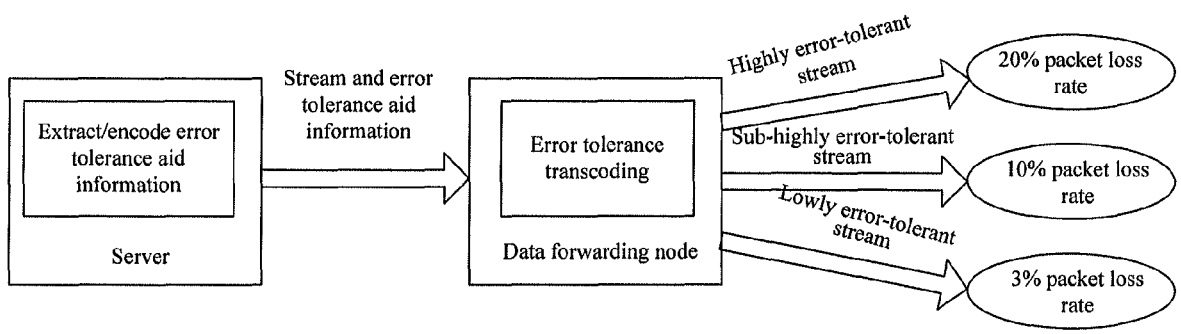

FIG. 1

The data server obtains error tolerance aid information corresponding to a source stream according to packet loss rates corresponding to at least two transmission networks in a data transmission network system before sending the source stream to the data transmission network system ~ 100

The data server sends the error tolerance aid information to the data forwarding node ~ 101

FIG. 2

VIDEO DATA TRANSMISSION PROCESSING METHOD, VIDEO DATA SENDING PROCESSING METHOD, APPARATUS, NETWORK SYSTEM

CROSS-REFERENCE TO RELATED APPLICATIONS

This application is a continuation of International Application No. PCT/CN2010/077526, filed on Sep. 30, 2010, which claims priority to Chinese Patent Application No. 200910179726.5, filed on Sep. 30, 2009, both of which are hereby incorporated by reference in their entireties.

FIELD OF THE INVENTION

The present invention relates to the field of video data transmission technologies, and in particular, to a video data transmission processing method, a video data sending processing method, an apparatus, and a network system.

BACKGROUND OF THE INVENTION

In an existing video transmission application environment, various networks exist, including wired networks and wireless networks. These networks have different data error probabilities, that is, the reliability of signal transmission is different. For example, in a video transmission network, a video stream provided by a video server is forwarded by a media gateway (Media Gateway), and the media gateway extracts and sends the video substreams required by other networks. For video stream applications, a delay and packet loss in network transmission may cause that a video packet is unavailable, so that quality of a decoded video decreases severely. Generally, in a wired network, a packet loss rate is relatively low, and a transmission rate is relatively high. However, a wireless network (the networks such as WLAN, 3G network based on a base station, and GPRS) is the contrary. In a wired network, the data packet loss rate is relatively low, and packet loss is mainly caused by congestion of routers in the network. However, in a wireless network, a high packet loss rate is caused by limited bandwidth, high delay, and high bit error rate.

Because the error probability in a wireless environment is far greater than that in a wired environment, the video server should provide an error control function to enable seamless switching among these different networks when a video user accesses video data. An existing error control technology includes error tolerance transcoding. That is, a video server provides a stream suitable for a wired network, and then a transcoder is added at the network border so that redundancy suitable for the target network is provided for the video stream. A video agent is used as a transcoder to decode an original stream and then encode it, which increases complexity of the transcoder, and also increases a system delay. The existing error control technology further includes redundant frame coding, which aims at using redundant information to protect a series of compressed images, so that the compressed images have the ability to recover from errors or impact caused by communication errors on the compressed images is reduced. However, this method generates redundant frames in the case of a given packet loss rate, which may cause a waste of network resources. For example, in a wired channel from the video server to the first data forwarding node and in the wireless channel from the first data forwarding node to the second data forwarding node, the error probability of the former channel is lower than that of the latter channel. However, in order for the user after the second data forwarding node to obtain better video decoding quality, the video server needs to add much redundancy in the stream, thereby causing a waste of bandwidth in the channel from the video server to the first data forwarding node.

In the implementation of the present invention, the inventor finds the prior art has at least the following problems: In at least two transmission networks with different packet loss rates in the prior art, a stream is generated according to a fixed packet loss rate. If the stream is generated according to a high packet loss rate, the redundancy is excessive, and therefore the utilization rate of bandwidth resources is low; or, if the stream is generated according to a low packet loss rate, the video quality deteriorates when the network conditions become worse.

SUMMARY OF THE INVENTION

Embodiments of the present invention provide a video data transmission processing method, a video data sending processing method, an apparatus, and a network system, so as to improve the error tolerance capability of a stream in different network environments with different packet loss rates.

An embodiment of the present invention provides a video data transmission processing method, including:
receiving a source stream sent from a source transmission network to a target transmission network;
performing, according to respective packet loss rates of the source transmission network and the target transmission network as well as error tolerance aid information corresponding to the source stream, error tolerance coding processing on the source stream to obtain an error tolerance stream; and
sending the obtained error tolerance stream to the target transmission network.

An embodiment of the present invention provides a video data sending processing method, including:
obtaining error tolerance aid information corresponding to a source stream according to packet loss rates corresponding to at least two transmission networks in a data transmission network system before sending the source stream to the data transmission network system, where the error tolerance aid information is used by a data forwarding node in the data transmission network system to perform error tolerance coding processing on the received stream to obtain an error tolerance stream for reference; and
sending the error tolerance aid information to the data forwarding node.

An embodiment of the present invention provides a data forwarding node device, including:
a first receiving module, configured to receive a source stream sent from a source transmission network to a target transmission network;
a coding processing module, configured to perform error tolerance coding processing on the source stream according to respective packet loss rates of the source transmission network and the target transmission network as well as error tolerance aid information corresponding to the source stream to obtain an error tolerance stream; and
a first sending module, configured to send the obtained error tolerance stream to the target transmission network.

An embodiment of the present invention provides a network device, including:
a first obtaining module, configured to obtain error tolerance aid information corresponding to a source stream according to packet loss rates corresponding to at least two transmission networks in a data transmission network system before sending the source stream to the data transmission network system, where the error tolerance aid information is used by a data forwarding node in the data transmission network system to perform error tolerance coding processing on the received stream to obtain an error tolerance stream for reference; and a second sending module, configured to send the error tolerance aid information to the data forwarding node.

An embodiment of the present invention provides a network system, including:

a data forwarding node device, configured to: receive a source stream sent from a source transmission network to a target transmission network; perform error tolerance coding on the source stream according to respective packet loss rates of the source transmission network and the target transmission network as well as error tolerance aid information corresponding to the source stream to obtain an error tolerance stream; and send the obtained error tolerance stream to the target transmission network; and a network device, configured to: obtain error tolerance aid information corresponding to a source stream according to packet loss rates corresponding to at least two transmission networks in a data transmission network system before sending the source stream to the data transmission network system; and send the error tolerance aid information to the data forwarding node device, where the error tolerance aid information is used by the data forwarding node device in the data transmission network system to perform error tolerance coding processing on the received stream to obtain an error tolerance stream for reference.

In the video data transmission processing method, video data sending processing method, apparatus, and network system provided in the embodiments of the present invention, the data server obtains error tolerance aid information corresponding to the to-be-sent stream according to packet loss rates corresponding to at least two transmission networks in the data transmission network system. Therefore, according to different packet loss rates of transmission networks, the data forwarding node can use the error tolerance aid information to quickly generate the error tolerance stream compliant with the packet loss characteristics of the subsequent transmission network, which can improve the error tolerance capability of streams in different network environments with different packet loss rates.

BRIEF DESCRIPTION OF THE DRAWINGS

To illustrate the technical solutions in the embodiments of the present invention more clearly, the accompanying drawings for describing the embodiments are briefly introduced below. Apparently, the accompanying drawings in the following descriptions are merely some embodiments of the present invention, and persons of ordinary skill in the art may further derive other drawings according to these accompanying drawings without creative efforts.

FIG. 1 is a schematic diagram of a method for extracting and using error tolerance aid information according to an embodiment of the present invention;

FIG. 2 is a flow chart of an embodiment of a data sending processing method according to the present invention;

DETAILED DESCRIPTION OF THE EMBODIMENTS

Figure 3:
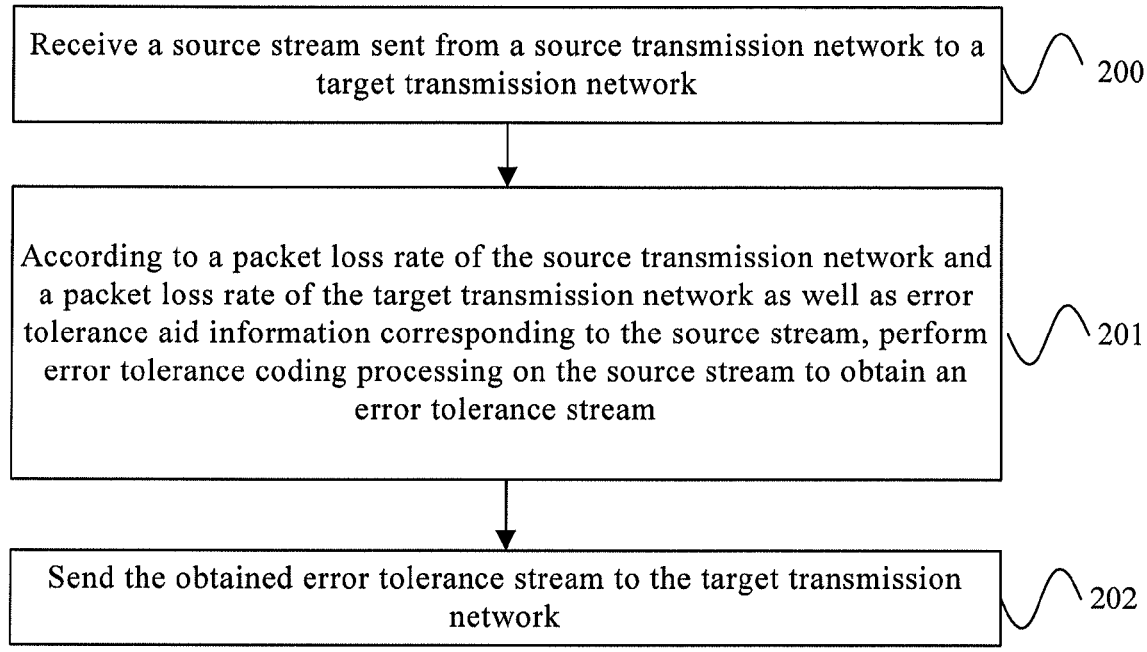
FIG. 3 is a flow chart of an embodiment of a data transmission processing method according to the present invention.

To make the objectives, the technical solutions and the advantages of the embodiments of the present invention more comprehensive, the technical solutions in the embodiments of the present invention will be clearly and fully described below with reference to the accompanying drawings. Apparently, the embodiments to be described are a part rather than all of the embodiments of the present invention. All other embodiments obtained by persons of ordinary skill in the art based on the embodiments of the present invention without creative efforts shall fall within the protection scope of the present invention.

With the development of network technologies, network convergence may be performed on various kinds of networks, such as a wired network and a wireless network, to form an integrated network system to meet different requirements of users. However, different networks have different packet loss rates, and the packet loss in network transmission leads to problems such as unavailability of a video packet and deteriorates quality of decoded videos severely. To meet the packet loss rate of different networks and improve the error tolerance capability of a stream in network environments with different packet loss rates, it is necessary to make full and proper use of network resources, provide better video quality, make fast response to every change, and change the error tolerance capability of the stream according to actual conditions, for example, change the stream redundancy rate and the forward error correction (Forward Error Correction, FEC for short) protection strength.

To sum up, for a case of different packet loss rates of data streams in network transmission, each embodiment of the present invention put forwards a coding and transmission solution characterized by scalable error resilience. FIG. 1 is a schematic diagram of a method for extracting and using error tolerance aid information according to an embodiment of the present invention. As shown in FIG. 1, analysis and calculation are performed on the coding side first, and detailed description information that is generated according to network environments and video characteristics is used to aid in generating a subsequent error tolerance stream. The information is defined as error tolerance aid information. The error tolerance aid information may be embedded into the stream or transmitted to each data forwarding node by other means. Then, considering change of the network in the transmission process, the data forwarding node uses the error tolerance aid information to quickly generate an error tolerance stream compliant with the subsequent network packet loss characteristics according to the packet loss rate of the subsequent network. In this embodiment, the error tolerance aid information is introduced, and the data forwarding node may transcode the stream quickly according to the aid information and the corresponding packet loss rate, which makes full use of system bandwidth resources. Moreover, low delay and low operation complexity are good for real-time application. In FIG. 1, the data forwarding node may be a device such as a streaming server, a media gateway, or a router; and the error tolerance aid information may be used for adding a redundant frame of the stream and for FEC.

FIG. 2 is a flow chart of an embodiment of a data sending method according to the present invention. As shown in FIG. 2, the method includes the following:

Step 100: The data server obtains error tolerance aid information corresponding to a source stream according to packet loss rates corresponding to at least two transmission networks in a data transmission network system before sending the source stream to the data transmission network system.

In this embodiment, the data transmission network system includes a data server that is used to provide data sources, and further includes multiple data forwarding nodes that are used to forward sent data, and a user equipment terminal. The data server, the data forwarding nodes, and the terminal device are connected through various transmission networks. The transmission networks provide a channel for data transmission. Based on the network convergence technology, at least two transmission networks in the data transmission network system have different packet loss rates. To make a sent video streams adaptable to network packet loss characteristics of different transmission networks and to ensure reliability of data transmission, the data server such as a video server obtains the error tolerance aid information corresponding to the sent source stream before sending the video stream to a certain data forwarding node in the data transmission network system. The error tolerance aid information includes description information about error tolerance data sets that respectively correspond to the respective packet loss rates of at least two transmission networks such as the source transmission network and the target transmission network in the data transmission network system. The error tolerance data sets are configured to identify the error tolerance data that needs to be adjusted in the source stream. Each error tolerance data set indicated by the description information meets the following condition: An error tolerance data set corresponding to a low packet loss rate is a subset of an error tolerance data set corresponding to a high packet loss rate. The error tolerance aid information is used by the data forwarding node in the data transmission network system to perform error tolerance coding processing on the received stream to obtain the error tolerance stream compliant with the packet loss rate corresponding to the subsequent transmission network. That is to say, the data forwarding node can perform quick transcoding on the packet loss rate of the subsequent transmission network of the data forwarding node according to the error tolerance aid information, and uses the error tolerance aid information to quickly generate the error tolerance stream compliant with the subsequent network packet loss characteristics.

The video server needs to generate the error tolerance aid information according to the packet loss rates corresponding to at least two transmission networks in the data transmission network system. That is to say, the information described by the error tolerance aid information may be adaptable to transmission networks of different packet loss rates. After receiving the stream sent by a previous transmission network, with the aid of the error tolerance aid information, the data forwarding node can find error tolerance operation rules corresponding to two packet loss rates of the previous transmission network and the next transmission network, and perform error tolerance transcoding according to an indication to generate an error tolerance stream. Definitely, the data streams of different characteristics should correspond to different error tolerance aid information, so as to meet requirements. In this embodiment, the data server may be a device such as a video server, a video-on-demand server.

Step 101: The data server sends the error tolerance aid information to the data forwarding node.

After obtaining the error tolerance aid information corresponding to the video stream to be sent, the data server sends the error tolerance aid information to each data forwarding node in the data transmission network system for the data forwarding node to perform error tolerance coding.

Before sending the video data to the data forwarding node that is connected with the data server, in order to adapt to the packet loss rate of the transmission network between the data forwarding nodes, the data server should perform error tolerance coding on the source stream according to the previously obtained error tolerance aid information. After generating the error tolerance stream corresponding to the source stream according to the error tolerance aid information and the packet loss rate corresponding to the transmission network between the data forwarding nodes, the data server may send the error tolerance stream together with the error tolerance aid information to the data forwarding node. Definitely, the error tolerance stream and the error tolerance aid information may also be sent separately and independently.

In the data sending processing method provided in this embodiment, the data server obtains error tolerance aid information corresponding to the to-be-sent stream according to packet loss rates corresponding to at least two transmission networks in the data transmission network system, and sends the error tolerance aid information to the data forwarding node. Therefore, according to different packet loss rates of transmission networks, the data forwarding node can use the error tolerance aid information to quickly generate the error tolerance stream compliant with the packet loss characteristics of the subsequent transmission network, which can improve the error tolerance capability of a stream in network environments with different packet loss rates. Moreover, low delay and low operation complexity are good for real-time application.

FIG. 3 is a flow chart of an embodiment of a data transmission method according to the present invention. As shown in FIG. 3, the method includes the following:

Step 200: Receive a source stream sent from a source transmission network to a target transmission network.

According to the packet loss rates corresponding to at least two transmission networks in the data transmission network system such as the source transmission network and the target transmission network of the data forwarding node, the data server obtains the error tolerance aid information corresponding to the source stream, and sends the error tolerance aid information to the data forwarding node, and then the data forwarding node receives the error tolerance aid information. The source transmission network and the target transmission network involved in this embodiment refer to the transmission networks on both sides of the data forwarding node from the perspective of the flow direction of the data. The source stream received by the data forwarding node may be sent by the data server or by other data forwarding nodes. For example, the data server sends the source stream to the terminal device through the data forwarding node. In this embodiment, the transmission network between the data server and the data forwarding node may be called a source transmission network, and the transmission network between the data forwarding node and the terminal device may be called a target transmission network. That is to say, the source stream sent by the data server is sent through the source transmission network to the target transmission network.

Step 201: Perform error tolerance coding on the source stream according to respective packet loss rates of the source transmission network and the target transmission network as well as error tolerance aid information corresponding to the source stream to obtain an error tolerance stream.

When the network is constructed, the data forwarding node already acquires the respective packet loss rates of the source transmission network and the target transmission network. Therefore, after receiving the source stream sent by the data server, the data forwarding node may perform fast transcoding on the source stream according to the respective packet loss rates of the source transmission network and the target transmission network, and with reference to the error tolerance aid information. The data forwarding node uses the error tolerance aid information to quickly generate the error tolerance stream compliant with the subsequent network packet loss characteristics, makes fast response to change of the packet loss rate, and changes the error tolerance capability of the stream according to actual conditions, for example, changes the stream redundancy rate and the FEC protection strength according to actual conditions. The error tolerance coding process should be different from the video coding process. The error tolerance coding is a relatively simple operation of changing the error tolerance capability, and may a process of copying the stream directly or adding some codes.

Step 202: Send the obtained error tolerance stream to the target transmission network.

After obtaining the error tolerance stream of the subsequent transmission network, the data forwarding node sends the error tolerance stream to the terminal device or other data forwarding nodes through the target transmission network. In addition, the data forwarding node may further forward the error tolerance aid information and the error tolerance stream together or separately to other data forwarding nodes.

Through the data transmission method provided in this embodiment, according to the error tolerance aid information sent by the data server and corresponding to the data stream, the data forwarding node performs error tolerance coding on the stream needed to be forwarded to obtain an error tolerance stream, so as to adapt to the network characteristics of the packet loss rate of the subsequent transmission network. Network resources can be made full and proper use of; fast response may be made to every change; and the error tolerance capability of the stream is changed according to actual conditions.

The error tolerance aid information involved in all embodiments above may be adaptable to a variety of application environments. The following gives application examples of using the error tolerance aid information to adjust redundant frames adaptively or perform FEC protection.

In an embodiment of adjusting the redundant frames adaptively, according to the packet loss rates corresponding to at least two transmission networks in the data transmission network system, the data server obtains the error tolerance aid information that is used by the data forwarding node in adjusting redundant frames in the received stream adaptively to obtain the error tolerance stream compliant with the packet loss rate of the subsequent transmission network. The error tolerance aid information includes description information about the redundant frame sets corresponding to the at least two transmission networks respectively in the data transmission network systems. The redundant frame sets are configured to identify data frames whose redundant frames need to be generated among multiple data frames in the stream. Each redundant frame set indicated by the description information meets the following condition: A redundant frame set corresponding to a low packet loss rate is a subset of a redundant frame set corresponding to a high packet loss rate. Therefore, the redundant frame set is an example of the error tolerance data set in the foregoing embodiment. For the data forwarding node, according to the respective packet loss rates of the source transmission network and the target transmission network as well as the error tolerance aid information corresponding to the source stream, the data forwarding node may adjust the redundant frames adaptively for multiple data frames included in the received source stream, so as to obtain an error tolerance stream complaint with the packet loss rate of the target transmission network.

In this embodiment, the error tolerance aid information may be applied to add redundant frames in the stream adaptively. The detailed implementation steps are as follows. First, estimate the overall source-and-channel distortion in the coding process of the data server, and extract the redundancy description information of each frame under different packet loss rates; second, add such tiny amount of information into the stream for transmission, or transmit the information to the data forwarding node separately; and then, the data forwarding node may add or delete redundant frames adaptively for different packet loss rates according to the redundancy description information.

The foregoing redundancy description information is an example of the error tolerance aid information. The process of extracting such information includes the following. First, calculate source distortion information and channel distortion information corresponding to each data frame in the stream with respect to packet loss rates of at least two transmission networks in the case of generating no redundant frame and in the case of generating redundant frames respectively; afterward, a rate-distortion model is applied to judge whether redundant frames of the data frames corresponding to the calculated source distortion information and channel distortion information need to be generated under the corresponding packet loss rate condition to obtain a judgment result, namely, using a rate-distortion model to select the best-performance mode of generating redundant frames for different packet loss rates respectively; finally, according to the judgment result, obtain the description information that organizes and describes redundant frame sets corresponding to different packet loss rates respectively. The following gives more details.

The source distortion and the channel distortion are estimated by using an improved recursive optimal per-pixel estimate (Recursive Optimal Per-pixel Estimate, ROPE for short) algorithm. It is assumed that the stream of a video frame is encapsulated into a packet in the transmission process. Therefore, in a case that the current packet loss rate is p, the probability of losing each video frame is also p. If the value of pixel i in frame n of an original video sequence is $f_n^i$, the restructured value on the coding side is $\hat{f}_n^i$, and the restructured value on the decoding side is $\tilde{f}_n^i$, and therefore, the overall source-and-channel distortion may be expressed as a mean square error of $f_n^i$ and $\tilde{f}_n^i$. The coding side is unable to obtain the precise restructured value on the decoding side after the stream is transmitted by an erroneous channel. Therefore, $\tilde{f}_n^i$ may be regarded as a random signal under an erroneous channel, and the overall source-and-channel distortion changes to:

$$E\{d_n^i\} = E\{(f_n^i - \tilde{f}_n^i)^2\} \quad (1)$$
$$= E\{(f_n^i - \hat{f}_n^i + \hat{f}_n^i - \tilde{f}_n^i)^2\}$$
$$= E\{(f_n^i - \hat{f}_n^i)^2 + (\hat{f}_n^i - \tilde{f}_n^i)^2 + 2(f_n^i - \hat{f}_n^i)\square(\hat{f}_n^i - \tilde{f}_n^i)\}$$
$$= (f_n^i - \hat{f}_n^i)^2 + E\{(\hat{f}_n^i - \tilde{f}_n^i)^2\} + E\{(f_n^i - \hat{f}_n^i)\square(\hat{f}_n^i - \tilde{f}_n^i)\}$$

and $$E\{d_n^i\} = E\{(f_n^i - \tilde{f}_n^i)^2\} \quad (2)$$
$$= (f_n^i)^2 + E\{(\tilde{f}_n^i)^2\} + 2f_n^i \square E\{\tilde{f}_n^i\}$$

$(f_n^i - \hat{f}_n^i)^2$ represents source distortion; $E\{(\hat{f}_n^i - \tilde{f}_n^i)^2\}$ represents channel distortion; and the third term in formula (1) is a correlation of source distortion with channel distortion. In addition, formula (2) gives another expression mode of the overall source-and-channel distortion. It can be seen that, the overall source-and-channel distortion is a result of estimating the first-order moment and the second-order moment of $\tilde{f}_n^i$. An embodiment of the present invention provides a method for estimating the first-order moment and the second-order moment based on pixels—ROPE. It is assumed that an error concealment method used on the decoding side is FC, then the first-order moment and the second-order moment may be calculated recursively in a pixel coding mode:

Pixels in an intra-frame prediction (Intra prediction, Intra for short) code block are as follows:

$$E\{\tilde{f}_n^i\}\{I\} = (1-p)\hat{f}_n^i + pE\{\tilde{f}_{n-1}^i\} \quad (3)$$

$$E\{(\tilde{f}_n^i)^2\}\{I\} = (1-p)(\hat{f}_n^i)^2 + pE\{(\tilde{f}_{n-1}^i)^2\} \quad (4)$$

Pixels in an inter-frame prediction (Inter prediction, Inter for short) code block are as follows:

$$E\{\tilde{f}_n^i\}\{P\} = (1-p)(\hat{e}_n^i + E\{\tilde{f}_{n-1}^j\}) + pE\{\tilde{f}_{n-1}^i\} \quad (5)$$

$$E\{(\tilde{f}_n^i)^2\}\{P\} = (1-p)E\{(\hat{e}_n^i + E\{\tilde{f}_{n-1}^j\})^2\} + pE\{(\tilde{f}_{n-1}^i)^2\} \quad (6)$$
$$= (1-p)((\hat{e}_n^i)^2 + 2\hat{e}_n^i E\{\tilde{f}_{n-1}^j\} + E\{(\tilde{f}_{n-1}^j)^2\}) +$$
$$pE\{(\tilde{f}_{n-1}^i)^2\}$$

In the Inter coding, pixel i of the current frame is a pixel in location j and is obtained according to motion compensation by referring to the previous frame (reference frame). The prediction error $e_n^i$ is quantized into $\hat{e}_n^i$.

In the process of calculating the overall source-and-channel distortion of pixels of the current frame in this embodiment, the case that a redundant frame of the current frame exists must be taken into consideration. Unlike the ROPE method, the mode of a pixel in the redundant frame at this time may be different from the mode of the pixel in the same location of the current frame. Even if the Inter mode is the same, the motion vector may differ. Therefore, when calculating the first-order moment and the second-order moment of the pixel, this embodiment puts forward the following recursion formula in consideration of combinations of such modes:

(1) Pixels of both the redundant frame and the current frame are in an Intra block:

$$E\{(\tilde{f}_n^i)\}\{I\} = (1-p)\hat{f}_n^i + p(1-p)\hat{f}_{r_n}^i + p^2 E\{\tilde{f}_{n-1}^i\} \quad (7)$$

$$E\{(\tilde{f}_n^i)^2\}\{I\} = (1-p)(\hat{f}_n^i)^2 + p(1-p)(\hat{f}_{r_n}^i)^2 + p^2 E\{(\tilde{f}_{n-1}^i)^2\} \quad (8)$$

(2) Pixels of both the redundant frame and the current frame are in an Inter block:

$$E\{\tilde{f}_n^i\}\{PP\} = (1-p)(\hat{e}_n^i + E\{\tilde{f}_{n-1}^j\}) + \quad (9)$$
$$p(1-p)E\{(\hat{e}_{r_n}^i + E\{\tilde{f}_{n-1}^{jr}\})^2\} + p^2 E\{(\tilde{f}_{n-1}^i)^2\}$$

$$E\{(\tilde{f}_n^i)^2\}\{PP\} = (1-p)E\{(\hat{e}_n^i + E\{\tilde{f}_{n-1}^j\})^2\} + \quad (10)$$
$$p(1-p)E\{(\hat{e}_{r_n}^i + E\{\tilde{f}_{n-1}^{jr}\})^2\} + p^2 E\{(\tilde{f}_{n-1}^i)^2\}$$
$$= (1-p)((\hat{e}_n^i)^2 + 2\hat{e}_n^i E\{\tilde{f}_{n-1}^j\} + E\{(\tilde{f}_{n-1}^j)^2\}) +$$
$$p(1-p)((\hat{e}_{r_n}^i)^2 + 2\hat{e}_{r_n}^i E\{\tilde{f}_{n-1}^{jr}\} + E\{(\tilde{f}_{n-1}^{jr})^2\}) +$$
$$p^2 E\{(\tilde{f}_{n-1}^i)^2\}$$

(3) Pixels of the redundant frame are in an Intra block, and pixels of the current frame are in an Inter block:

$$E\{\tilde{f}_n^i\}\{IP\} = (1-p)(\hat{e}_n^i + E\{\tilde{f}_{n-1}^j\}) + p(1-p)\hat{f}_{r_n}^i + p^2 E\{\tilde{f}_{n-1}^i\} \quad (11)$$

$$E\{(\tilde{f}_n^i)^2\}\{IP\} = (1-p)((\hat{e}_n^i)^2 + 2\hat{e}_n^i E\{\tilde{f}_{n-1}^j\} + E\{(\tilde{f}_{n-1}^j)^2\}) + \quad (12)$$
$$p(1-p)(\hat{f}_{r_n}^i)^2 + p^2 E\{(\tilde{f}_{n-1}^i)^2\}$$

(4) Pixels of the redundant frame are in an Inter block, and pixels of the current frame are in an Intra block:

$$E\{\tilde{f}_n^i\}\{PI\} = (1-p)\hat{f}_n^i + p(1-p)E\{(\hat{e}_{r_n}^i + E\{\tilde{f}_{n-1}^{jr}\})^2\} + p^2 E\{(\tilde{f}_{n-1}^i)^2\} \quad (13)$$

$$E\{(\tilde{f}_n^i)^2\}\{PI\} = (1-p)(\hat{f}_n^i)^2 + p(1-p)E\{(\hat{e}_{r_n}^i + E\{\tilde{f}_{n-1}^{jr}\})^2\} + \quad (14)$$
$$p^2 E\{(\tilde{f}_{n-1}^i)^2\}$$
$$= (1-p)(\hat{f}_n^i)^2 + p(1-p)$$
$$((\hat{e}_{r_n}^i)^2 + 2\hat{e}_{r_n}^i E\{\tilde{f}_{n-1}^{jr}\} + E\{(\tilde{f}_{n-1}^{jr})^2\}) +$$
$$p^2 E\{(\tilde{f}_{n-1}^i)^2\}$$

In the current frame, pixel i of the Inter block uses pixel j in the previous frame (reference frame) as a reference, and the prediction error $e_n^i$ is quantized as $\hat{e}_n^i$; in a redundant frame, pixel i of the Inter block uses pixel $j_r$ in the previous frame (reference frame) as a reference, and the prediction error $e_{r_n}^i$ is quantized as $\hat{e}_{r_n}^i$.

The following considers the overall source-and-channel distortion of an entire frame (M is the number of pixels in each frame):

$$D = \sum_{i=0}^{M} E\{d_n^i\} \quad (15)$$

$$= \sum_{i=0}^{M} \left\{ (f_n^i)^2 + E\left\{(\tilde{f}_n^i)^2\right\} + 2f_n^i E\{\tilde{f}_n^i\} \right\}$$

The overall source-and-channel distortion of the current frame in the case of generating redundant frames and in the case of generating no redundant frame may be calculated respectively by using formula (15) and formulas (3)-(14). Further, the framing of no redundant frame and the framing of a redundant frame are regarded as two modes, respectively mode 1, and mode 2. The mode may be selected according to rate-distortion criteria:

$$RD \cos t(\text{mode1}) = D_1 + \lambda R_1 \quad (16)$$

$$RD \cos t(\text{mode2}) = D_2 + \lambda R_2 \quad (17)$$

$D_1$ is the overall source-and-channel distortion of the frame without any redundant frame and is calculated by using formulas (3)-(6) and formula (15); and $D_2$ is the overall source-and-channel distortion of the frame with a redundant frame and is calculated by using formulas (7)-(14) and formula (15). $R_1$ is the bit rate of the current frame, and $R_2$ is the total bit rate when a redundant frame is included. $\lambda$ in the formulas is a Lagrange parameter when an error exists. For the detailed calculation method, reference may be made to the following embodiment. When the cost function value of mode 1 is greater than the cost function value of mode 2, a redundant frame may be allocated to the current frame.

According to the method above, different redundant frame sets may be generated for different packet loss rates:

$$\Re_{X\%} = \{P_{r\_X} | X = 3, 5, 10, 20\} \quad (18)$$

$\Re_{X\%}$ is a set of redundant frames $P_{r\_X}$ generated when the packet loss rate is $X\%$.

To make the generated redundant frames be scalable under different packet loss rates, such sets must meet the following condition:

$$\{\Re_{3\%} \subseteq \Re_{5\%} \subseteq \Re_{10\%} \subseteq \Re_{20\%}\} \quad (19)$$

In the practical operation process, a procedure of generating redundant information during coding is: First, generate a redundant frame set $\Re_{20\%}$ under a 20% packet loss rate; afterward, add the following constraint to each frame under a packet loss rate of 10%, 5%, and 3% successively: if a redundant frame of the frame is generated in a case that the packet loss rate is higher than the current packet loss rate, a redundant frame of the frame is generated under the current packet loss rate; otherwise, no redundant frame of the frame is generated. Experiments show that, after such a constraint is added, compared with the case that the redundant frame is generated for each packet loss rate independently, the performance does not deteriorate obviously. Then describe and transmit information about a specific frame whose redundant frame needs to be generated under specific packet loss rates, so that the data forwarding node may adapt to different packet loss rates by using such information to add or delete a redundant frame in a stream quickly.

Figure 4:
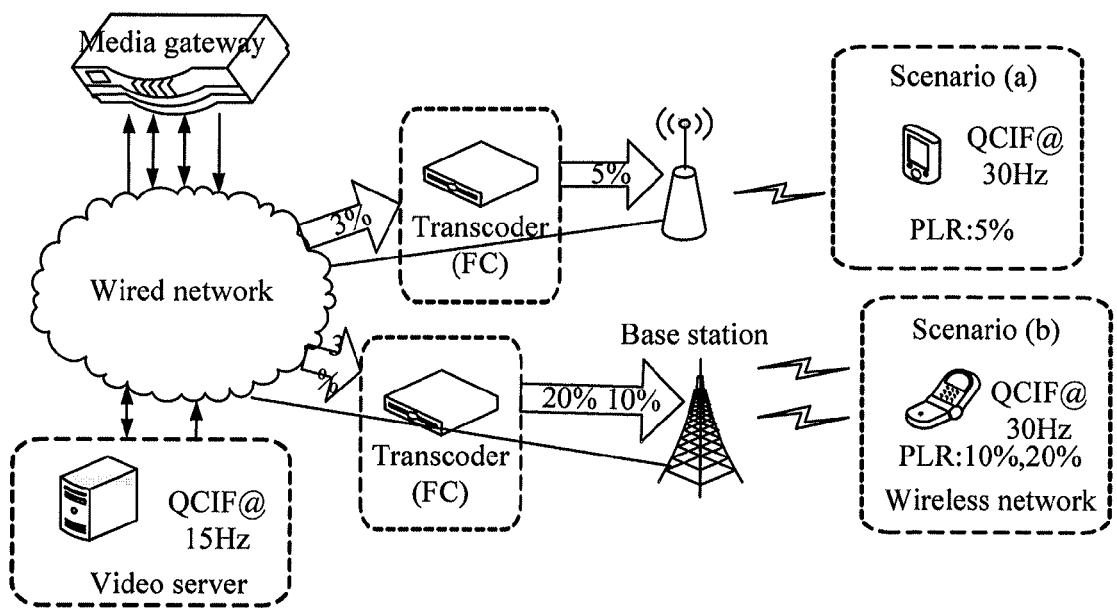
FIG. 4 is a schematic diagram of an application scenario of an increased packet loss rate in a video transmission process according to an embodiment of the present invention.

According to the respective packet loss rates of the source transmission network and the target transmission network as well as the error tolerance aid information corresponding to the source stream, the data forwarding node adjusts the redundant frames adaptively for multiple data frames included in the source stream. Specifically, the adjustment may include the following three cases:

If the first packet loss rate corresponding to the source transmission network is less than the second packet loss rate corresponding to the target transmission network, according to the first redundant frame set corresponding to the first packet loss rate and the second redundant frame set corresponding to the second packet loss rate that are indicated in the description information, the redundant frames which exist in the second redundant frame set but do not exist in the first redundant frame set are added into the source stream that carries the redundant frame corresponding to the first packet loss rate. FIG. 4 is a schematic diagram of an application scenario of an increased packet loss rate in a video transmission process according to an embodiment of the present invention. As shown in FIG. 4, the video server generates low-redundancy stream compliant with the current packet loss rate (3%) and generates redundancy description information. For higher packet loss rates (such as 5% and 20%) in the subsequent transmission network, the data forwarding node determines the frame whose redundant frame is required to be added but is lacking under the current packet loss rate (5%, 20%), and then adds a redundant frame for such a frame through such operations as copying the frame or generating duplicates of different quality. This operation has low complexity, may ensure the best efficiency of the entire system, and improves quality of transmitting videos.

Figure 5:
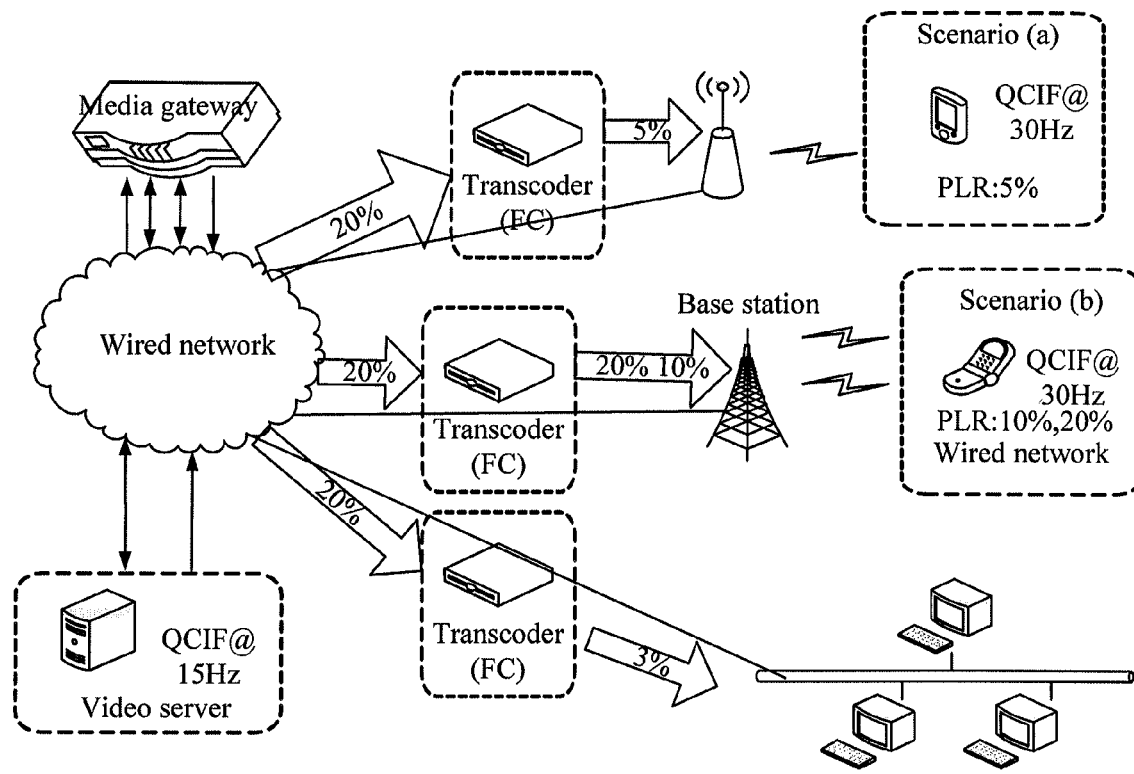
FIG. 5 is a schematic diagram of an application scenario of a decreased packet loss rate in a video transmission process according to an embodiment of the present invention.

If the first packet loss rate corresponding to the source transmission network is greater than the second packet loss rate corresponding to the target transmission network, according to the first redundant frame set corresponding to the first packet loss rate and the second redundant frame set corresponding to the second packet loss rate that are indicated in the description information, the redundant frames which exist in the first redundant frame set but do not exist in the second redundant frame set are discarded from the source stream that carries the redundant frame corresponding to the first packet loss rate. FIG. 5 is a schematic diagram of an application scenario of a decreased packet loss rate in a video transmission process according to an embodiment of the present invention. As shown in FIG. 5, the video server generates the stream corresponding to the highest packet loss rate (20%) and generates redundancy description information. The corresponding redundant frame may be discarded from the stream according to the packet loss rate at the time of switching to a channel that has a relatively low packet loss rate. For example, the first transcoder (namely, data forwarding node) converts the high-redundancy stream into a stream that is suitable for transmission in a wired local area network (with a 3% packet loss rate); the second transcoder transmits the high-redundancy stream directly, or converts the high-redundancy stream into a sub-high-redundancy stream (with a 10% packet loss rate) and transmits it to a base station; and the third transcoder converts the high-redundancy stream into a low-redundancy stream (with a 5% packet loss rate) and transmits it to a wireless node. In such a solution, although the stream stored in the video server has the greatest redundancy rate, it is not necessary to generate any redundant frame by encoding again, and the flexible error resilience may be provided, which is noticeably beneficial for the efficiency of the entire system.

If the first packet loss rate corresponding to the source transmission network is equal to the second packet loss rate corresponding to the target transmission network, the data may be forwarded directly without any adjustment.

In this embodiment, a pixel-based distortion estimation algorithm is used; the redundant frames can be allocated adaptively and precisely, and then a scalable constraint is added, so that a redundancy with scalable error resilience is generated. Further, a tiny number of bits (such as 3 bits) are used to record redundancy description information for each frame. Specifically, the redundancy description information may be coded into the data of each frame, or a group of pictures (Group Of Pictures, GOP for short) or a video is described uniformly. The description information is coded into a head end of the GOP or a head end of the video, so that the bandwidth efficiency of the entire transmission system reaches the highest level during the applications of different packet loss rates.

The following is an experiment for the application where the packet loss rate in the foregoing embodiment increases. The experiment environment is as follows: The experiment platform is H.264/AVC reference software JM 10.2; the sequence is Foreman; the video size is QCIF; the frame rate is 15 Hz; the quantization parameter (QP)=20, 24, 28, 32, 36, and 40; the Intra period is 40; the GOP structure is IPPP . . . ; 4000 frames are encoded; the packet loss rate is 3%, 5%, 10%, and 20% respectively, and in the packet discarding tool used in this embodiment, a frame is a packet; repeated decoding: under different packet loss rates, the packet loss file is offset randomly; the decoding is performed for three times, and the average value of the peak signal-to-noise ratios (Peak Signal-to-Noise Ratios, PSNRs for short) is taken.

The stream generated through the foregoing different quantization parameters QPs is processed with respect to specific packet loss rates to obtain a rate-distortion (Rate-Distortion, RD for short) curve. The average PSNR difference value between two curves may be calculated by using the first four QP points and the method provided in the embodiment of the present invention.

First, in the stream that includes no redundancy, a redundant frame corresponding to the packet loss rate is added according to the algorithm in the foregoing embodiment. Table 1 illustrates enhancement of performance compared between this stream and a stream where no redundant frame is added. The 0% vs X % line illustrates enhancement of performance compared between a stream that is generated under an X % packet loss rate and includes a redundant frame and a stream that includes no redundant frame under an X % packet loss rate. For example, with the channel packet loss rate being 3%, if redundancy is added according to the redundant frame adding mode corresponding to a 3% packet loss rate in the redundant frame aid information, the performance is 0.84 dB higher than the performance in the case with no redundant frame being added. Therefore, the stream that is generated through this algorithm and includes a redundant frame has better performance under different packet loss rates. Moreover, with increase of the packet loss rate, the performance enhancement is more noticeable. For a low packet loss rate (3%), nearly 1 dB objective quality enhancement accomplishable may be obtained; for a high packet loss rate (20%), nearly 8 dB objective quality enhancement accomplishable may be obtained.

TABLE 1

Comparison of performance of redundant frames under different packet loss rates

| | ΔPSNR(dB) | ΔBitRate(%) |
|---|---|---|
| 0% vs 3% | 0.84 | −16.82 |
| 0% vs 5% | 2.42 | −45.75 |
| 0% vs 10% | 5.59 | −99.97 |
| 0% vs 20% | 7.62 | <−100.00 |

Secondly, in application, to reflect the performance of scalable redundant frames under different packet loss rates in the foregoing embodiments, only streams with a small amount of redundancy are stored, and then redundancy is added adaptively according to the actual packet loss rate of the transmission channel by using the method according to the foregoing embodiments. In Table 2, the Y % vs X % line shows performance comparison when the channel packet loss rate is X %, between performance of directly transmitting a redundant stream generated under a Y % packet loss rate, and performance of transmitting a redundant stream into which redundancy is adaptively added for the purpose of adapting to a X % packet loss rate. For example, as shown in the 5% vs 10% line, when the channel packet loss rate is 10%, if redundancy description information is used to add redundancy and generate a stream compliant with a 10% packet loss rate, the performance of transmitting the stream is 1.05 dB higher than the performance of directly transmitting the stream generated when the packet loss rate is 5%. Moreover, the higher the channel packet loss rate is, the more noticeable the performance enhancement is. For a medium packet loss rate (10%), nearly 1 dB objective quality enhancement may be obtained for a high packet loss rate (20%), nearly 0.7 dB objective quality enhancement may be obtained. The experiment result shows that the redundant frame sets generated under different packet loss rates according to this algorithm are scalable. That is, redundant frames may be added quickly and adaptively according to the corresponding packet loss rate to improve the decoding quality.

TABLE 2

Comparison of scalability performance of redundant frames under different packet loss rates

| | ΔPSNR(dB) | ΔBitRate(%) |
|---|---|---|
| 5% vs 10% | 1.05 | −18.33 |
| 10% vs 20% | 0.71 | −18.47 |

Thirdly, Table 3 shows performance comparison between error tolerance protection conducted by using redundancy description information and error tolerance protection conducted in an adaptive intra-frame refresh mode. Each line shows decoding performance comparison of streams under different packet loss rates when the two modes are used to perform error tolerance protection. Under a low packet loss rate, the performance of the algorithm in this embodiment decreases slightly; under a high packet loss rate, however, the performance of the algorithm in this embodiment increases. Considering the coding complexity of the algorithm on the whole, the intra-frame refresh transcoding performs concatenated decoding and coding operations in the transcoder, and the complexity is high. However, it is merely required to perform the operation of copying frames in the transcoder in the embodiment of the present invention, and the complexity is relatively low. It should be noted that: When the adaptive intra-frame refresh coding mode selection algorithm is used in transcoding, the performance is theoretically lower than the performance being achieved by using the adaptive intra-frame refresh method provided here. The reason is that the input in the transcoding process is a restructuring of a compressed stream, and, after the restructuring is encoded again, the performance is lower than the performance of using the intra-frame refresh mode selection algorithm at the time of encoding the original sequence directly. Therefore, according to the embodiment of the present invention, the performance of the algorithm for using the redundancy description information to perform error tolerance protection may be further improved if compared with that of the infra-frame refresh used in the transcoding process.

TABLE 3

Performance comparison between adaptive adding of redundant frames and adaptive intra-frame refresh

| ARP vs AIR | ΔPSNR(dB) | ΔBitRate(%) |
|---|---|---|
| At PLR 3% | −0.31 | 6.89 |
| At PLR 5% | −0.02 | 1.97 |
| At PLR 10% | 0.89 | −17.65 |
| At PLR 20% | 0.59 | −14.70 |

Figure 6:
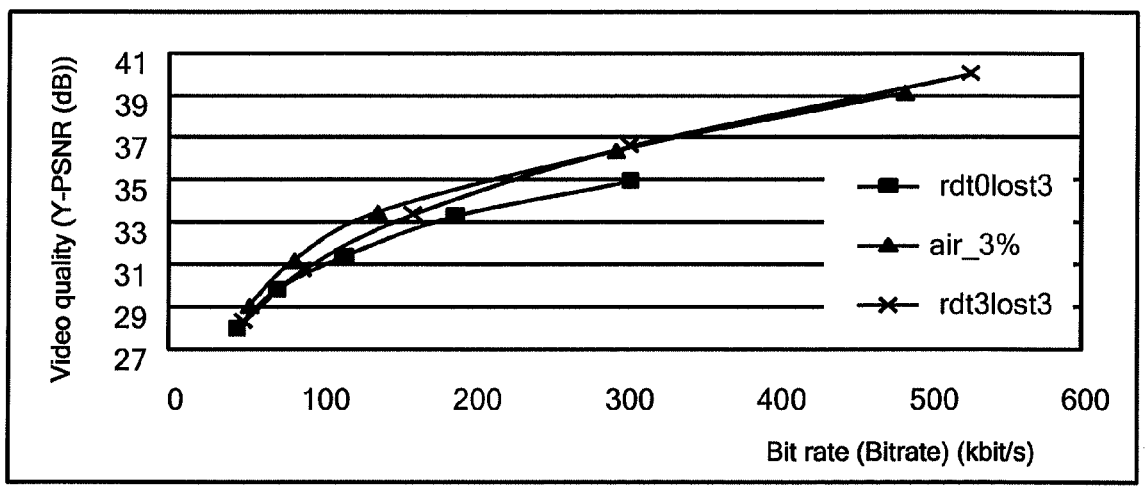
FIG. 6 is a schematic diagram of performance of adding redundancy under a 3% packet loss rate according to an embodiment of the present invention.
Figure 7:
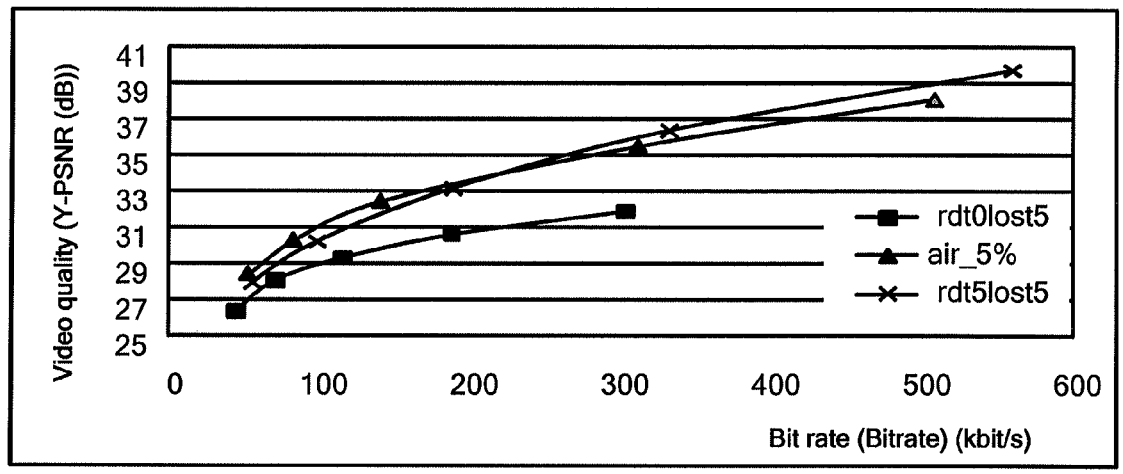
FIG. 7 is a schematic diagram of performance of adding redundancy under a 5% packet loss rate according to an embodiment of the present invention.
Figure 8:
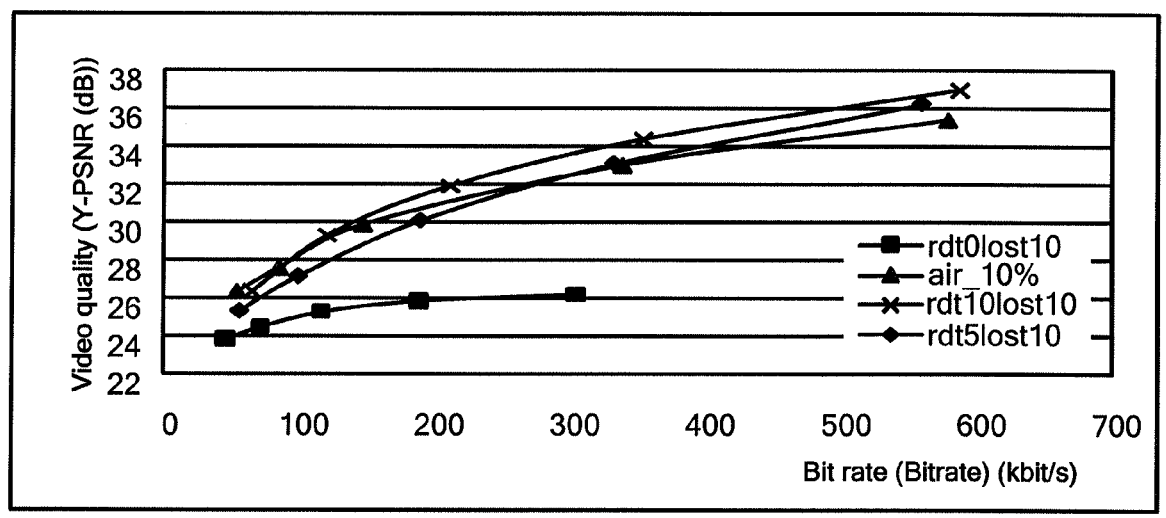
FIG. 8 is a schematic diagram of performance of adding redundancy under a 10% packet loss rate according to an embodiment of the present invention.
Figure 9:
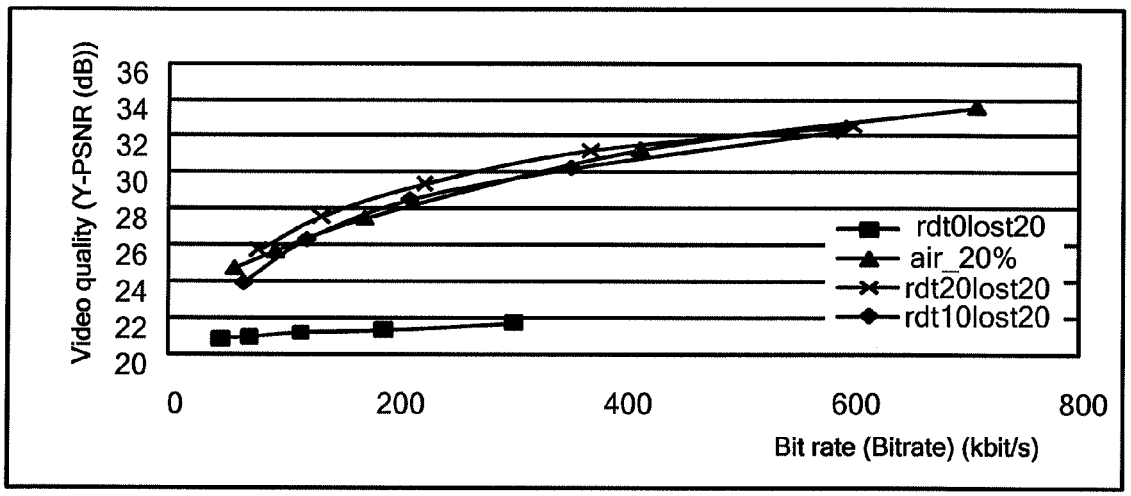
FIG. 9 is a schematic diagram of performance of adding redundancy under a 20% packet loss rate according to an embodiment of the present invention.

FIG. 6 is a schematic diagram of performance of adding redundancy under a 3% packet loss rate according to an embodiment of the present invention; FIG. 7 is a schematic diagram of performance of adding redundancy under a 5% packet loss rate according to an embodiment of the present invention; FIG. 8 is a schematic diagram of performance of adding redundancy under a 10% packet loss rate according to an embodiment of the present invention; FIG. 9 is a schematic diagram of performance of adding redundancy under a 20% packet loss rate according to an embodiment of the present invention. FIG. 6 to FIG. 9 show performance comparison of a test sequence named "Foreman" under different packet loss rates to test the impact caused by adding redundancy adaptively according to the redundancy description information, and the error tolerance protection performed in an adaptive intra-frame refresh mode when the resolution of the video is 176×144. rdtYlostX is an RD curve of decoding a stream under an X % packet loss rate, where the stream is generated according to redundancy description information of a Y % packet loss rate; and air_X % is an RD curve of decoding a stream under an X % packet loss rate after an intra-frame refresh coding mode is selected on the coding side by using X % as a target packet loss rate.

It can be more visually seen from the foregoing drawings that, the benefits brought by the embodiments of the present invention include the following. The higher the packet loss rate is, the greater impact on the streams without redundancy is; however, under a low packet loss rate, few packets are lost, and the performance enhanced by adding redundant frames is limited. Therefore, the objective quality enhancement brought by the embodiments of the present invention under a high packet loss rate is greater than that under a low packet loss rate. The objective quality enhancement brought by adding redundant frames under a low bit rate is less than that under a high bit rate. Because the quality of a video is low under a low bit rate, the nuances between the previous frame and the next frame are eliminated by great quantization. At this time, the effect of using an error concealment method to conceal lost frames is not too bad. Therefore, adding redundant frames cannot much enhance the objective quality. However, under a high bit rate, using the error concealment method to conceal the lost frames is not good. At this time, adding redundant frames enhances the video quality greatly. For different packet loss rates, different numbers of redundant frames need to be added. For example, under a 10% packet loss rate, if the redundant frame adding policy corresponding to the 5% packet loss rate is used, there is still potentiality of enhancing performance. At this time, a better policy is to use the redundant frame adding policy corresponding to the 10% packet loss rate. Compared with the adaptive intra-frame refresh coding mode selection algorithm, the algorithm in this embodiment does not deteriorate the coding performance obviously. Under a low packet loss rate, the performance of the algorithm in the embodiment of the present invention decreases slightly; under a high packet loss rate, however, the performance of the algorithm in the embodiment of the present invention is superior. The complexity of the algorithm in the embodiment of the present invention is much lower than the complexity of the intra-frame refresh.

For an embodiment of FEC protection, the data server obtains, according to the packet loss rates corresponding to at least two transmission networks in the data transmission network system, the error tolerance aid information for the data forwarding node to adjust forward error correction redundancy for each data source block (Source Block, which refers to a data unit for performing FEC protection uniformly and is a combination of one or multiple packets) in the received stream to obtain the error tolerance stream compliant with the packet loss rate of the subsequent transmission network. The error tolerance aid information includes forward error correction description information about the forward error correction sets that correspond to the respective packet loss rates of the source transmission network and the target transmission network respectively. The forward error correction set includes the forward error correction redundancy that needs to be allocated to each data source block under different packet loss rates, and each forward error correction set that is indicated in the forward error correction description information meets the following condition: A forward error correction set corresponding to a low packet loss rate is a subset of a forward error correction set corresponding to a high packet loss rate. Therefore, the forward error correction set is an example of the error tolerance data set in the foregoing embodiment. The FEC description information put forward in this embodiment may provide assistance for FEC. The detailed implementation steps are as follows: First, at the same time of generating a video stream, the data server such as video server generates FEC description information, so as to indicate the FEC redundancy that needs to be actually allocated to each data source block under different packet loss rates; moreover, in order to make the FEC description information support the operation of scalable FEC adjustment, a certain constraint is added when the description is generated, that is, the FEC redundancy of each data source block cannot be decreased when the packet loss rate increases; then, these FEC description information is added into the stream for transmission, or is transmitted to the data forwarding node separately.

For the data forwarding node, the data forwarding node may adjust, according to the respective packet loss rates of the source transmission network and the target transmission network as well as the FEC description information corresponding to the source stream, the forward error correction redundancy for each data source block in the source stream to obtain an error tolerance stream compliant with the packet loss rate of the target transmission network. Specifically, if the first packet loss rate corresponding to the source transmission network is less than the second packet loss rate corresponding to the target transmission network, the corresponding forward error correction redundancy is added on the basis of the forward error correction redundancy carried in each data source block in the source stream according to the FEC description information; if the first packet loss rate corresponding to the source transmission network is greater than the second packet loss rate corresponding to the target transmission network, the corresponding forward error correction redundancy is discarded on the basis of the forward error correction redundancy carried in each data source block in the source stream according to the FEC description information.

If the first packet loss rate corresponding to the source transmission network is equal to the second packet loss rate corresponding to the target transmission network, the data may be forwarded directly without any processing.

Figure 10:
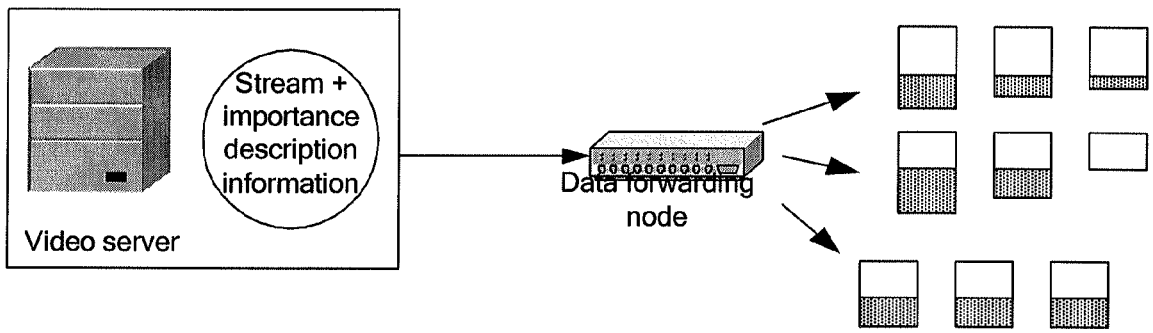
FIG. 10 is a schematic diagram of using forward error correction description information for FEC redundancy allocation according to a method embodiment of the present invention.

FIG. 10 is a schematic diagram of using forward error correction description information for FEC redundancy allocation according to a method embodiment of the present invention. FIG. 10 shows an application example of FEC description information in a video transmission system: The video server generates a video stream that carries the FEC description information, The FEC description information indicates the FEC redundancy that needs to be added in each video data source block under a given packet loss rate. The data forwarding node arranges different redundancy rate for each video data source block according to the packet loss rate of the subsequent transmission network to implement unequal FEC protection. In the example shown in FIG. 10, a GOP video data packet is divided into three data source blocks (indicated by the white part in FIG. 10). Different redundancy (indicated by the grey part in FIG. 10) is added for different data source blocks respectively. In this way, all streams that are transmitted through the data forwarding node may reach the best performance under the current packet loss rate, and the operation complexity is relatively low.

In the method provided in this embodiment, the data server may have the error tolerance aid information for describing the FEC allocation of data carried in the sent stream, or send the error tolerance aid information separately, so that the relevant data node can perform different FEC protections on the data sources of different importance levels according to the error tolerance aid information, which not only ensures reliability of data transmission, but also improves usage of the bandwidth resource.

Figure 11:
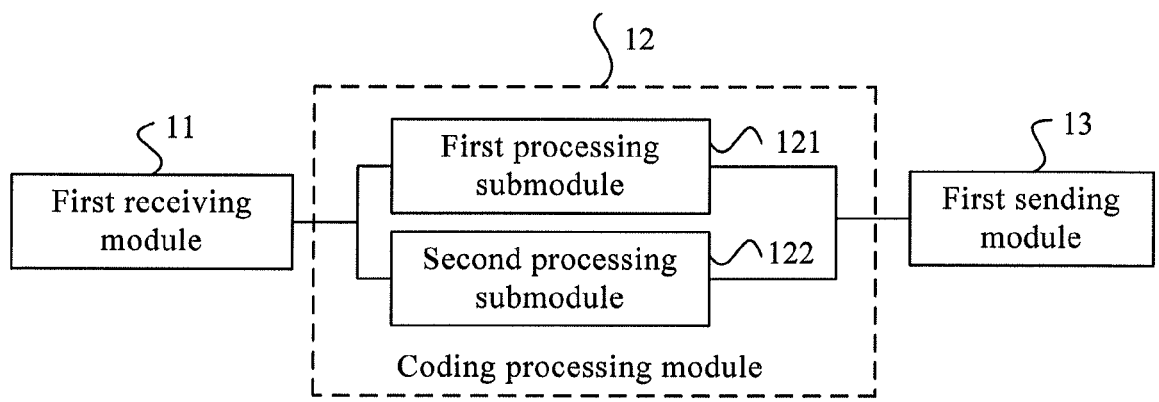
FIG. 11 is a schematic structure diagram of an embodiment of a data forwarding node device according to the present invention.

FIG. 11 is a schematic structure diagram of a data forwarding node device according to an embodiment of the present invention. As shown in FIG. 11, the data forwarding node is connected to different networks, and is capable of storage and calculation to some extent, and may be a device such as a streaming server, a media gateway, and a router. The data forwarding node includes a first receiving module 11, a coding processing module 12, and a first sending module 13. The first receiving module 11 is configured to receive a source stream sent from a source transmission network to a target transmission network; the coding processing module 12 is configured to perform error tolerance coding processing on the source stream according to respective packet loss rates of the source transmission network and the target transmission network as well as error tolerance aid information corresponding to the source stream to obtain an error tolerance stream; and the first sending module 13 is configured to send the obtained error tolerance stream to the target transmission network.

Specifically, according to the packet loss rates corresponding to at least two transmission networks in the data transmission network system of the data forwarding node, the data server obtains the error tolerance aid information corresponding to the source stream, and sends the error tolerance aid information to the data forwarding node, and then the data forwarding node receives the error tolerance aid information through the first receiving module 11. When the network is constructed, the data forwarding node already acquires the respective packet loss rates of the source transmission network and the target transmission network. Therefore, after the first receiving module 11 receives the source stream sent by the data server, the coding processing module 12 performs fast transcoding on the source stream according to the respective packet loss rates of the source transmission network and the target transmission network, and with reference to the error tolerance aid information, uses the error tolerance aid information to quickly generate the error tolerance stream compliant with the subsequent network packet loss characteristics, makes fast response to a change of the packet loss rate, and changes the error tolerance capability of the stream according to actual conditions, for example, adjusts the stream redundancy rate and the FEC protection strength according to actual conditions. After obtaining the error tolerance stream, the coding processing module 12 uses the first sending module 13 to send the error tolerance stream to the terminal device or other data forwarding nodes through the target transmission network.

Further, the coding module 12 may adjust the stream redundancy rate and the FEC protection strength according to the error tolerance aid information, which may be specifically completed through. at least one submodule included in the coding processing module 12, and include the following:

The first processing submodule 121 is configured to adjust redundant frames adaptively for multiple data frames included in the source stream according to the respective packet loss rates of the source transmission network and the target transmission network as well as the error tolerance aid information corresponding to the source stream to obtain an error tolerance stream. The error tolerance aid information includes description information about the redundant frame sets corresponding to the respective packet loss rates of the source transmission network and the target transmission network. The redundant frame sets are configured to identify data frames whose redundant frames need to be generated among multiple data frames in the source stream. Each redundant frame set that is indicated by the description information meets the following condition: A redundant frame set corresponding to a low packet loss rate is a subset of a redundant frame set corresponding to a high packet loss rate. This embodiment does not need to perform very complicated transcoding on the stream; the data forwarding node stores the error tolerance aid information under each packet loss rate, and then uses the information to implement scalable redundancy allocation. The stream of the highest coding efficiency may be transmitted in a wired network, and the redundant frames are added or deleted quickly by the data forwarding node according to the error tolerance aid information.

The second processing submodule 122 is configured to adjust forward error correction redundancy for data source blocks in the source stream according to the respective packet loss rates of the source transmission network and the target transmission network as well as error tolerance aid information corresponding to the source stream to obtain an error tolerance stream. The error tolerance aid information includes forward error correction description information about forward error correction sets corresponding to respective packet loss rates of the source transmission network and the target transmission network respectively. The forward error correction set includes the forward error correction redundancy that needs to be allocated to each data source block under different packet loss rates, and each forward error correction set that is indicated in the forward error correction description information meets the following condition: A forward error correction set corresponding to a low packet loss rate is a subset of a forward error correction set corresponding to a high packet loss rate. The data forwarding node in this embodiment may be a device such as a streaming server, a media gateway, and a router.

The data forwarding node provided in this embodiment can perform, according to the error tolerance aid information sent by the data server and corresponding to the data stream, error tolerance coding processing on the stream that needs to be forwarded to obtain an error tolerance stream that is adaptable to the network characteristics of the packet loss rate of the subsequent transmission network. This embodiment makes full and proper use of network resources, makes fast response to every change, and changes the error tolerance capability of the stream according to actual conditions.

Figure 12:
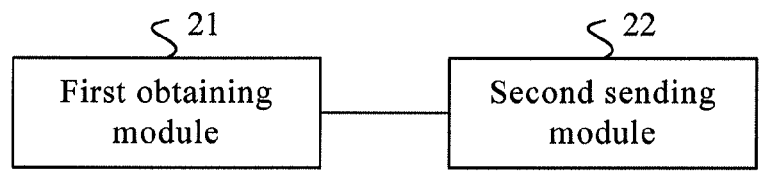
FIG. 12 is a schematic structure diagram of a network device according to a first embodiment of the present invention.

FIG. 12 is a schematic structure diagram of a network device according to a first embodiment of the present invention. As shown in FIG. 12, the network device includes a first obtaining module 21 and a second sending module 22. The first obtaining module 21 is configured to obtain error tolerance aid information corresponding to a source stream according to packet loss rates corresponding to at least two transmission networks in a data transmission network system before sending the source stream to the data transmission network system, where the error tolerance aid information is used by a data forwarding node in the data transmission network system to perform error tolerance coding processing on the received stream to obtain an error tolerance stream for reference; and the second sending module 22 is configured to send the error tolerance aid information to the data forwarding node.

Specifically, before sending a video stream to a certain data forwarding node in the data transmission network system, the network device needs to obtain the error tolerance aid information corresponding to the sent stream through the first obtaining module 21. The error tolerance aid information is used by the data forwarding node in the data transmission network system to perform error tolerance coding processing on the received stream to obtain the error tolerance stream adaptable to the packet loss rate corresponding to the subsequent transmission network. That is to say, the data forwarding node can perform quick transcoding according to the error tolerance aid information to adapt to the packet loss rate of the subsequent transmission network of the data forwarding node, and uses the error tolerance aid information to quickly generate the error tolerance stream compliant with the subsequent network packet loss characteristics. After obtaining the error tolerance stream, the first obtaining module 21 sends the error tolerance aid information to each data forwarding node in the data transmission network system through the second sending module 22 for the data forwarding node to perform error tolerance coding. The error tolerance aid information may be carried in the stream or sent separately.

The network device provided in this embodiment may be the data server involved in the foregoing embodiments. The network device obtains error tolerance aid information corresponding to the to-be-sent stream according to packet loss rates corresponding to at least two transmission networks in the data transmission network system, and sends the error tolerance aid information to the data forwarding node. Therefore, according to different packet loss rates of transmission networks, the data forwarding node can use the error tolerance aid information to quickly generate the error tolerance stream compliant with the packet loss characteristics of the subsequent transmission network, which improves the error tolerance capability of streams in network environments with different packet loss rates.

Figure 13:
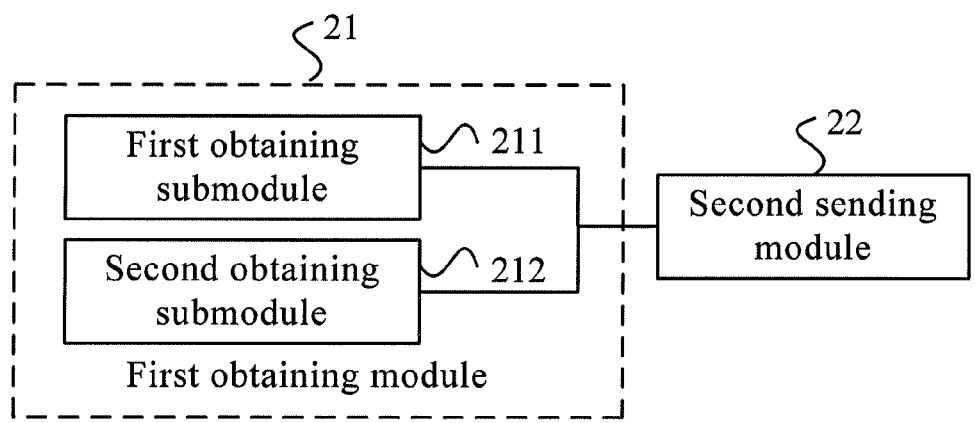
FIG. 13 is a schematic structure diagram of a network device according to a second embodiment of the present invention.

FIG. 13 is a schematic structure diagram of a network device according to a second embodiment of the present invention. As shown in FIG. 13, the network device includes a first obtaining module 21 and a second sending module 22. The first obtaining module 21 includes at least one of submodules in the following, where the submodule includes the following:

A first obtaining submodule 211 is configured to obtain, according to the packet loss rates corresponding to at least two transmission networks in the data transmission network system, error tolerance aid information for the data forwarding node to adjust redundant frames adaptively for the received stream to obtain an error tolerance stream. The error tolerance aid information includes description information about the redundant frame sets corresponding to the respective packet loss rates of the at least two transmission networks in the data transmission network system respectively. The redundant frame sets are configured to identify data frames whose redundant frames need to be generated among multiple data frames in the stream. Each redundant frame set that is indicated by the description information meets the following condition: A redundant frame set corresponding to a low packet loss rate is a subset of a redundant frame set corresponding to a high packet loss rate.

A second obtaining submodule 212 is configured to obtain, according to the packet loss rates corresponding to at least two transmission networks in the data transmission network system, the error tolerance aid information for the data forwarding node to adjust forward error correction redundancy for each data source block in the received stream to obtain an error tolerance stream. The error tolerance aid information includes forward error correction description information about the forward error correction sets corresponding to the respective packet loss rates of the at least two transmission networks in the data transmission network system respectively. The forward error correction set includes the forward error correction redundancy that needs be allocated to each data source block under different packet loss rates respectively. Each forward error correction set that is indicated by the forward error correction description information meets the following condition: A forward error correction set corresponding to a low packet loss rate is a subset of a forward error correction set corresponding to a high packet loss rate.

In addition, the second sending module 22 in the network device provided in this embodiment is further configured to send the error tolerance stream together with the error tolerance aid information to the data forwarding node after generating the error tolerance stream corresponding to the source stream according to the error tolerance aid information and the packet loss rate corresponding to the transmission network between the data forwarding nodes.

The network device provided in this embodiment may be the data server involved in the foregoing embodiments. The network device obtains the error tolerance aid information corresponding to the to-be-sent stream according to the packet loss rates corresponding to at least two transmission networks in the data transmission network system, and therefore, the data forwarding node can use the error tolerance aid information to quickly generate the error tolerance stream compliant with the packet loss characteristics of the subsequent transmission network according to different packet loss rates of transmission networks, which improves the error tolerance capability of streams in network environments with different packet loss rates. Moreover, the delay is short, and the operation complexity is low, which are conducive to real-time application.

Figure 14:
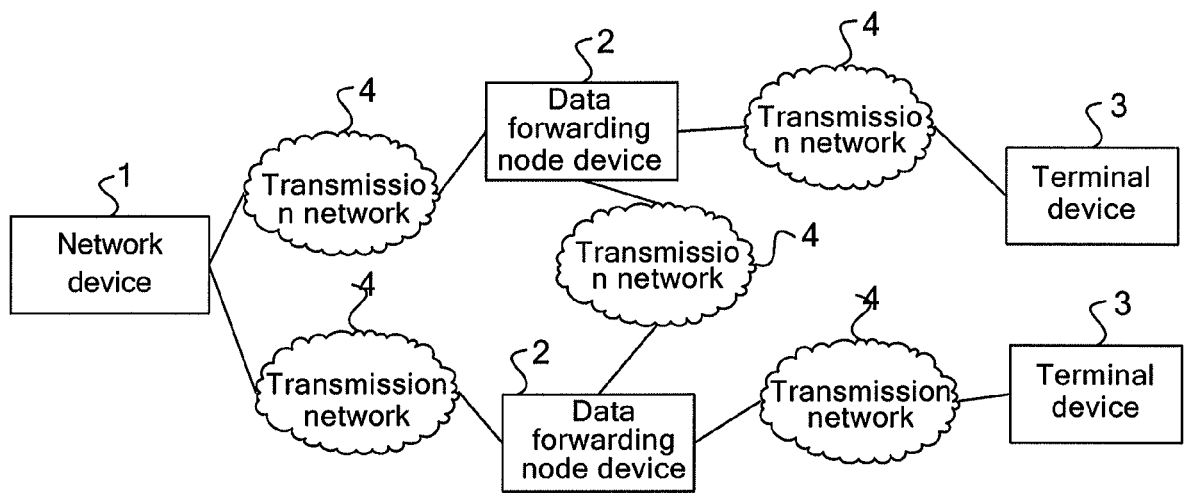
FIG. 14 is a schematic composition diagram of an embodiment of a network system according to the present invention.

FIG. 14 is a schematic composition diagram of a network system according to an embodiment of the present invention. As shown in FIG. 14, the network system includes a network device 1, a data forwarding node device 2, and a terminal device 3. The data forwarding node device 2 is configured to: receive a source stream sent from a source transmission network to a target transmission network; perform error tolerance coding on the source stream according to respective packet loss rates of the source transmission network and the target transmission network as well as error tolerance aid information corresponding to the source stream to obtain an error tolerance stream; and send the obtained error tolerance stream to the target transmission network; and the network device 1 is configured to: obtain error tolerance aid information corresponding to a source stream according to packet loss rates corresponding to at least two transmission networks in a data transmission network system before sending the source stream to the data transmission network system; and send the error tolerance aid information to the data forwarding node, where the error tolerance aid information is used by the data forwarding node in the data transmission network system to perform error tolerance coding processing on the received stream to obtain an error tolerance stream for reference.

The network device 1 provides a data source, and the data forwarding node device 2 is configured to forward the data to be sent to the terminal device 3, makes fast response to every change, changes the error tolerance capability of the stream according to actual conditions, and uses the error tolerance aid information to quickly generate the error tolerance stream compliant with the packet loss characteristics of the subsequent network. The network system further includes multiple transmission networks 4, which are respectively set between the network device 1, the data forwarding node device 2, and the terminal device 3, and are configured to provide data transmission channels between the network device 1, the data forwarding node device 2, and the data forwarding node device 3. The data forwarding node device and the network device in the network system provided in this embodiment may be the data forwarding node device and the network device provided in the foregoing embodiments respectively. For the structures and functions of the data forwarding node device and the network device, reference may be made to the description in the foregoing embodiments, and details are not described here again. The data forwarding node in the embodiment of the present invention may be a device such as a streaming server, a media gateway, and a router; and the network device in this embodiment may be the data server involves in the foregoing embodiments.

In the network system provided in this embodiment, the network device obtains the error tolerance aid information corresponding to the to-be-sent stream according to the packet loss rates corresponding to at least two transmission networks in the data transmission network system, and therefore, the data forwarding node can use the error tolerance aid information to quickly generate the error tolerance stream compliant with the packet loss characteristics of the subsequent transmission network according to different packet loss rates of transmission networks, which improves the error tolerance capability of streams in network environments with different packet loss rates. Moreover, the delay is short, and the operation complexity is low, which are conducive to real-time application.

Persons of ordinary skill in the art may understand that all or a part of the steps of the method according to the embodiments of the present invention may be implemented by a program instructing relevant hardware. The program may be stored in computer readable storage media. When the program runs, the steps of the method according to the embodiments of the present invention are performed. The storage media may be any media capable of storing program codes, such as a ROM, a RAM, a magnetic disk, or an optical disk.

Finally, it should be noted that: the above embodiments are merely provided for illustrating the technical solutions of the present invention, but are not intended to limit the present invention. Persons of ordinary skill in the art should understand that, although the present invention has been described in detail with reference to the foregoing embodiments, modifications may still be made to the technical solutions described in the foregoing embodiments, or equivalent replacements can be made to some technical features in the technical solutions, and these modifications or replacements do not cause the essence of corresponding technical solutions to depart from the spirit and scope of the technical solutions of the embodiments of present invention.

What is claimed is:

1. A video data transmission processing method, comprising performing by a data forwarding node device, the following:
   receiving through a source transmission network, a source stream sent from a data server to a target transmission network;
   performing error tolerance coding processing on the source stream to obtain an error tolerance target stream to be sent to the target transmission network, wherein the error tolerance coding processing is according to:
   respective packet loss rates of both the source transmission network and the target transmission network, and
   error tolerance aid information corresponding to the source stream sent from the data server; and
   sending the obtained error tolerance target stream to the target transmission network.

2. The video data transmission processing method according to claim 1, wherein:
   the error tolerance aid information comprises description information about error tolerance data sets that respectively correspond to the respective packet loss rates of the source transmission network and the target transmission network, and the error tolerance data sets are configured to identify error tolerance data that needs to be adjusted in the source stream.

3. The video data transmission processing method according to claim 2, wherein:
   each error tolerance data set that is indicated by the description information meets the following condition: an error tolerance data set corresponding to a low packet loss rate is a subset of an error tolerance data set corresponding to a high packet loss rate.

4. The video data transmission processing method according to claim 2, wherein: the performing of the error tolerance coding processing on the source stream according to the respective packet loss rates of the source transmission network and the target transmission network, and error tolerance aid information corresponding to the source stream from the data server, in order to obtain an error tolerance stream, comprises:
   according to the respective packet loss rates of the source transmission network and the target transmission network, and the error tolerance aid information corresponding to the source stream:
   adjusting by the data forwarding node device, redundant frames for multiple data frames included in the source stream to obtain the error tolerance stream, wherein the error tolerance data set is a redundant frame set that is configured to identify data frames whose redundant frames need to be generated among multiple data frames in the source stream.

5. The video data transmission processing method according to claim 4, wherein: the adjusting, according to the respective packet loss rates of the source transmission network and the target transmission network, and the error tolerance aid information corresponding to the source stream from the data server, and the redundant frames for the multiple data frames included in the source stream, comprises:
    if a first packet loss rate corresponding to the source transmission network is less than a second packet loss rate corresponding to the target transmission network:
        adding by the data forwarding node device, redundant frames which exist in a second redundant frame set but do not exist in a first redundant frame set into the source stream that carries the redundant frame corresponding to the first packet loss rate according to the first redundant frame set corresponding to the first packet loss rate and the second redundant frame set which corresponds to the second packet loss rate that are indicated in the description information; or
    if the first packet loss rate corresponding to the source transmission network is greater than the second packet loss rate corresponding to the target transmission network:
        discarding by the data forwarding node device, redundant frames which exist in the first redundant frame set but do not exist in the second redundant frame set from the source stream that carries the redundant frame corresponding to the first packet loss rate according to the first redundant frame set which corresponds to the first packet loss rate and the second redundant frame set corresponding to the second packet loss rate that are indicated in the description information.

6. The video data transmission processing method according to claim 2, wherein: the performing of the error tolerance coding processing on the source stream according to the respective packet loss rates of the source transmission network and the target transmission network, and error tolerance aid information corresponding to the source stream from the data server, in order to obtain an error tolerance stream, comprises:
    according to the respective packet loss rates of the source transmission network and the target transmission network, and the error tolerance aid information corresponding to the source stream:
        adjusting by the data forwarding node device, forward error correction redundancy for each data source block in the source stream to obtain the error tolerance stream, wherein the error tolerance data set is a forward error correction set, and the forward error correction set comprises forward error correction redundancy that needs to be allocated to each data source block under different packet loss rates.

7. The video data transmission processing method according to claim 6, wherein: the adjusting, according to the respective packet loss rates of the source transmission network and the target transmission network, and the error tolerance aid information corresponding to the source stream from the data server, and the forward error correction redundancy for each data source block in the source stream, comprises:
    if a first packet loss rate corresponding to the source transmission network is less than a second packet loss rate corresponding to the target transmission network:
        adding by the data forwarding node device, corresponding forward error correction redundancy on the basis of forward error correction redundancy carried in each data source block in the source stream according to the forward error correction description information; or
    if the first packet loss rate corresponding to the source transmission network is greater than the second packet loss rate corresponding to the target transmission network:
        discarding by the data forwarding node device, corresponding forward error correction redundancy on the basis of forward error correction redundancy carried in each data source block in the source stream according to the forward error correction description information.

8. The video data transmission processing method according to claim 1, wherein the method further comprises:
    forwarding the error tolerance aid information together with the error tolerance stream or separately.

9. A video data sending processing method, comprising:
    prior to sending a received source stream to a data transmission network system, obtaining by a data server, error tolerance aid information corresponding to the received source stream according to packet loss rates corresponding to at least two transmission networks which are comprised in the data transmission network system, wherein the error tolerance aid information is used by a data forwarding node device in the data transmission network system to perform error tolerance coding processing on the received source stream according to the obtained packet loss rates and the error tolerance aid information to obtain an error tolerance target stream for reference; and
    sending by the data server, the error tolerance aid information to the data forwarding node device.

10. The video data sending processing method according to claim 9, wherein the sending the error tolerance aid information to the data forwarding node device comprises:
    after generating the error tolerance stream corresponding to the source stream according to the error tolerance aid information and packet loss rates corresponding to transmission networks between data forwarding node devices, sending the error tolerance stream together with the error tolerance aid information to the data forwarding node device.

11. The video data sending processing method according to claim 9, wherein:
    the error tolerance aid information comprises description information about error tolerance data sets that respectively correspond to the respective packet loss rates of at least two transmission networks in the data transmission network system, and the error tolerance data sets are configured to identify error tolerance data that needs to be adjusted in the source stream.

12. The video data sending processing method according to claim 11, wherein:
    each error tolerance data set that is indicated by the description information which meets the following condition: an error tolerance data set corresponding to a low packet loss rate is a subset of an error tolerance data set corresponding to a high packet loss rate.

13. The video data sending processing method according to claim 11, wherein: the obtaining the error tolerance aid information corresponding to the source stream according to the packet loss rates corresponding to at least two transmission networks in the data transmission network system, comprises:

obtaining by the data server, according to the packet loss rates corresponding to the at least two transmission networks in the data transmission network system, the error tolerance aid information for the data forwarding node to adjust the received stream to obtain an error tolerance stream, wherein the error tolerance data set is a redundant frame set that is configured to identify data frames whose redundant frames need to be generated among multiple data frames in the source stream; or obtaining by the data server, according to the packet loss rates corresponding to at least two transmission networks in the data transmission network system, the error tolerance aid information for the data forwarding node device to adjust forward error correction redundancy for each data source block in the received stream to obtain the error tolerance stream, wherein the error tolerance data set is a forward error correction set, and the forward error correction set comprises forward error correction redundancy that needs to be allocated to each data source block under different packet loss rates.

14. The video data sending processing method according to claim 13, wherein: the obtaining, according to the packet loss rates corresponding to at least two transmission networks in the data transmission network system, the error tolerance aid information for the data forwarding node device to adjust redundant frames for the received stream to obtain the error tolerance stream, comprises:

calculating by the data server, source distortion information and channel distortion information corresponding to each data frame in the stream with respect to at least two packet loss rates in a case of generating no redundant frame and in a case of generating redundant frames respectively;

applying by the data server, a rate-distortion model to judge whether redundant frames of data frames corresponding to the calculated source distortion information and channel distortion information need to be generated under a corresponding packet loss rate condition to obtain a judgment result; and obtaining description information about redundant frame sets corresponding to the at least two packet loss rates respectively according to the judgment result.

15. A data forwarding node device, comprising:

a first receiving module, configured to receive through a source transmission network, a source stream sent from a data server to a target transmission network;

a coding processing module, configured to perform error tolerance coding on the source stream to obtain an error tolerance target stream to be sent to the target transmission network, wherein the error tolerance coding processing is according to respective packet loss rates of both the source transmission network and the target transmission network, and error tolerance aid information corresponding to the source stream sent from the data server; and a first sending module, configured to send the obtained error tolerance target stream to the target transmission network.

16. The data forwarding node device according to claim 15, wherein the coding processing module comprises:

a first processing submodule, configured to adjust redundant frames for multiple data frames included in the source stream according to the respective packet loss rates of the source transmission network and the target transmission network the error tolerance aid information corresponding to the source stream to obtain an error tolerance stream, wherein the error tolerance aid information comprises description information about redundant frame sets corresponding to the respective packet loss rates of the source transmission network and the target transmission network respectively, and the redundant frame sets are configured to identify data frames whose redundant frames need to be generated among multiple data frames in the source stream; or a second processing submodule, configured to adjust forward error correction redundancy for each data source block in the source stream according to the respective packet loss rates of the source transmission network and the target transmission network the error tolerance aid information corresponding to the source stream to obtain an error tolerance stream, wherein the error tolerance aid information comprises forward error correction description information about forward error correction sets corresponding to the respective packet loss rates of the source transmission network and the target transmission network respectively, and the forward error correction set comprises forward error correction redundancy that needs to be allocated to each data source block under different packet loss rates respectively.

17. The data forwarding node device according to claim 16, wherein:

each redundant frame set that is indicated by the description information meets the following condition: a redundant frame set corresponding to a low packet loss rate is a subset of a redundant frame set corresponding to a high packet loss rate; or each forward error correction set that is indicated by the forward error correction description information meets the following condition: a forward error correction set corresponding to a low packet loss rate is a subset of a forward error correction set corresponding to a high packet loss rate.

18. A network device, comprising:

a first obtaining module, configured to obtain error tolerance aid information corresponding to a source stream according to packet loss rates corresponding to at least two transmission networks in a data transmission network system before sending the source stream to the data transmission network system, wherein the error tolerance aid information is used by a data forwarding node device in the data transmission network system to perform error tolerance coding processing on the received stream to obtain an error tolerance stream for reference; and a second sending module, configured to send the error tolerance aid information to the data forwarding node device.

19. The network device according to claim 18, wherein the first obtaining module comprises:

a first obtaining submodule, configured to: obtain, according to the packet loss rates corresponding to at least two transmission networks in the data transmission network system, the error tolerance aid information for the data forwarding node to adjust redundant frames for a received stream to obtain an error tolerance stream, and the error tolerance aid information comprises: description information about redundant frame sets corresponding to the respective packet loss rates of at least two transmission networks in the data transmission network system respectively, and the redundant frame sets are configured to identify data frames whose redundant frames need to be generated among multiple data frames in the stream; or a second obtaining submodule, configured to: obtain, according to the packet loss rates corresponding to the at least two transmission networks in the data transmission network system, the error tolerance aid information for the data forwarding node to adjust forward error correction redundancy for each data source block in the received stream to obtain an error tolerance stream, wherein the error tolerance aid information comprises forward error correction description information about forward error correction sets corresponding to the respective packet loss rates of the at least two transmission networks in the data transmission network system respectively, and the forward error correction set comprises forward error correction redundancy that needs to be allocated to each data source block under different packet loss rates respectively.

20. The network device according to claim 19, wherein:
each redundant frame set that is indicated by the description information meets the following condition: a redundant frame set corresponding to a low packet loss rate is a subset of a redundant frame set corresponding to a high packet loss rate; or
each forward error correction set that is indicated by the forward error correction description information meets the following condition: a forward error correction set corresponding to a low packet loss rate is a subset of a forward error correction set corresponding to a high packet loss rate.

21. A network system, comprising:
a data forwarding node device, configured to:
  receive a source stream sent from a data server to a target transmission network;
  perform error tolerance coding on the source stream according to:
  respective packet loss rates of both the source transmission network and the target transmission network, and
  error tolerance aid information corresponding to the source stream sent from the data server to obtain an error tolerance stream; and
  send the obtained error tolerance stream to the target transmission network; and
a network device, configured to:
  obtain error tolerance aid information corresponding to a source stream according to packet loss rates corresponding to at least two transmission networks in a data transmission network system before sending the source stream to the data transmission network system; and
  send the error tolerance aid information to the data forwarding node device, wherein the error tolerance aid information is used by the data forwarding node device in the data transmission network system to perform error tolerance coding processing on the received stream to obtain an error tolerance stream for reference.

* * * * *